United States Patent [19]
Sato et al.

[11] Patent Number: 5,657,531
[45] Date of Patent: Aug. 19, 1997

[54] MAGNETIC HEAD ARM, METHOD OF PRODUCING THE SAME AND APPARATUS FOR PRODUCING THE SAME

[75] Inventors: Masateru Sato; Yasuo Warita; Seiichi Sugano; Toshiji Fujimori, all of Kawasaki, Japan

[73] Assignee: Fujitsu Limited, Kawasaki, Japan

[21] Appl. No.: 508,113

[22] Filed: Jul. 27, 1995

[30] Foreign Application Priority Data

Nov. 17, 1994 [JP] Japan .................... 6-283190

[51] Int. Cl.$^6$ ...................................... G11B 5/127
[52] U.S. Cl. .................... 29/603.04; 29/737; 29/760; 29/552.1; 360/104
[58] Field of Search ............ 29/603.04, 603.06, 29/418, 522.1, 737, 760, 530; 360/104

[56] References Cited

U.S. PATENT DOCUMENTS

| | | | |
|---|---|---|---|
| 4,759,119 | 7/1988 | Noguchi et al. | 29/603.06 |
| 4,796,122 | 1/1989 | Levy et al. | 360/104 |
| 4,964,941 | 10/1990 | Von Brandt et al. | 29/603.04 X |
| 5,390,058 | 2/1995 | Yamaguchi | 360/104 |
| 5,444,587 | 8/1995 | Johnson et al. | 29/552.1 X |

FOREIGN PATENT DOCUMENTS

| | | |
|---|---|---|
| 599669 | 6/1994 | European Pat. Off. . |
| 2-30189 | 2/1990 | Japan . |
| 5-12633 | 1/1993 | Japan . |
| 6-103716 | 4/1994 | Japan . |

*Primary Examiner*—Larry I. Schwartz
*Assistant Examiner*—Khan V. Nguyen
*Attorney, Agent, or Firm*—Greer, Burns & Crain

[57] ABSTRACT

A mounting portion (protruding portion provided with a through hole) of a magnetic head assembly is fitted into an insertion hole formed at the forward end of a carriage arm, and a thus-produced inlay portion is disposed between adjacent first members having a V-shaped slit. A second member is pushed into the V-shaped slit of each first member and the magnetic head assembly is pressed against the carriage arm by the expanding force of the slit portions of each first member which is produced in proportion to the amount of insertion of the second member, and the magnetic head assembly is held in a fixed state. In this state, a caulking ball is press-fitted into the through hole of the protruding portion with a caulking pin so as to caulk the inlay portion. The magnetic head assembly is pressed against the carriage arm perpendicularly thereto.

12 Claims, 18 Drawing Sheets

FIG.4A
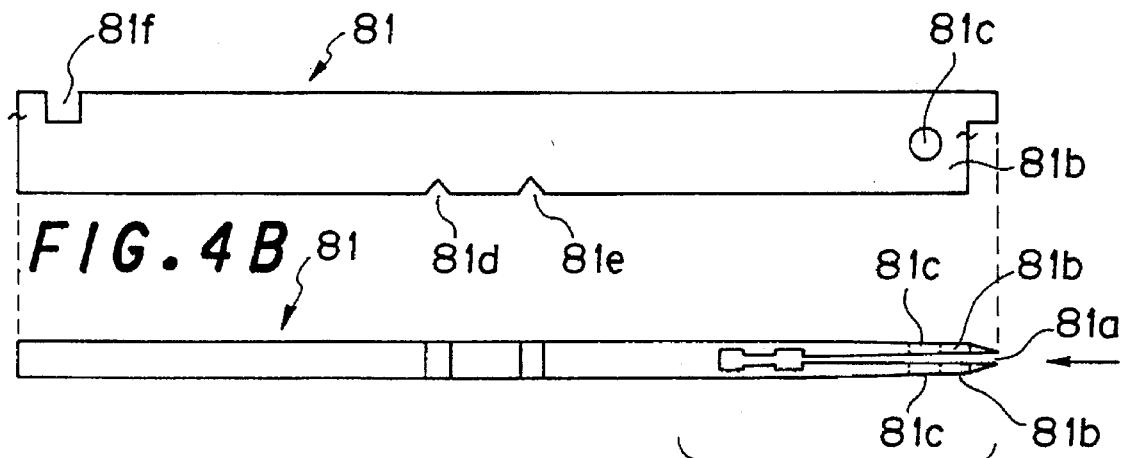
FIG.4B
FIG.4C
FIG.5A
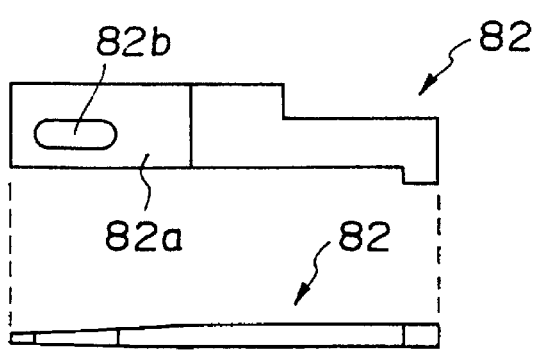
FIG.5B

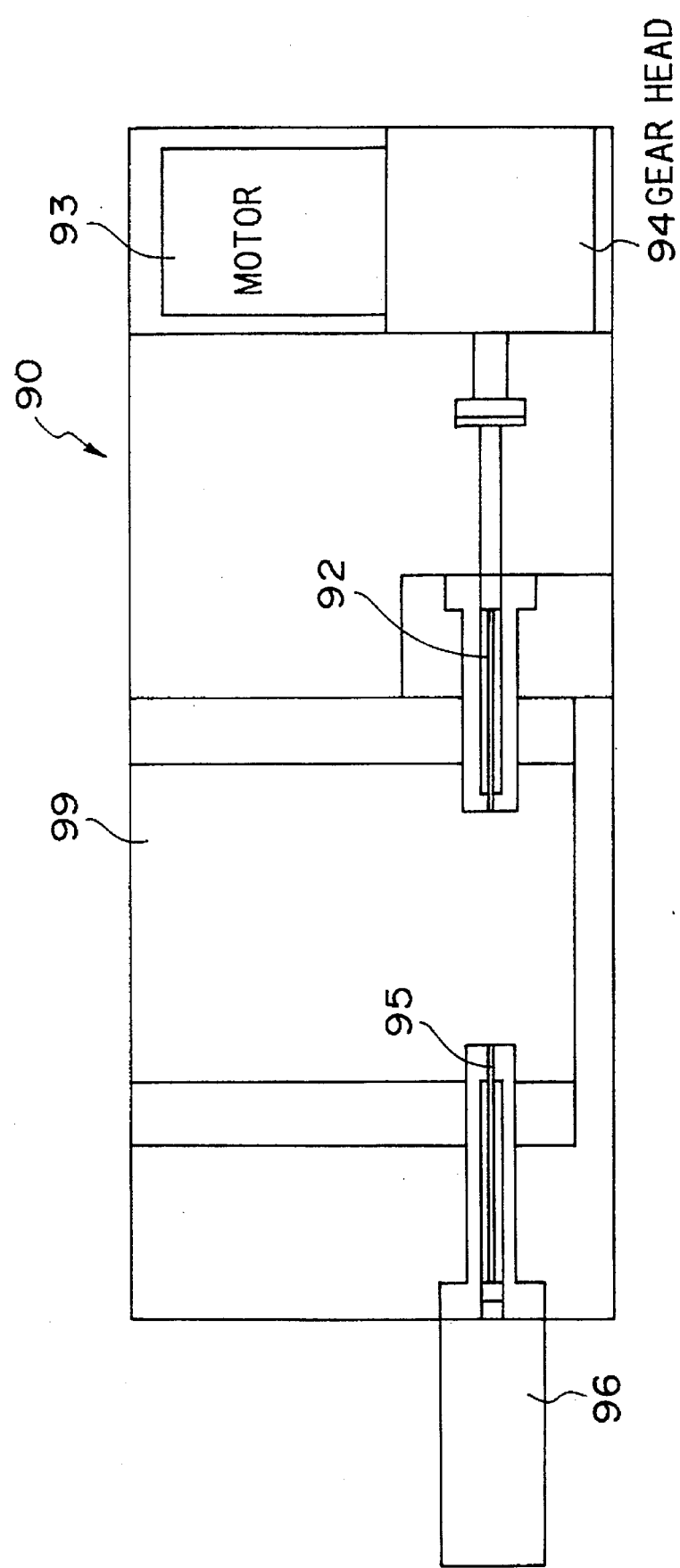

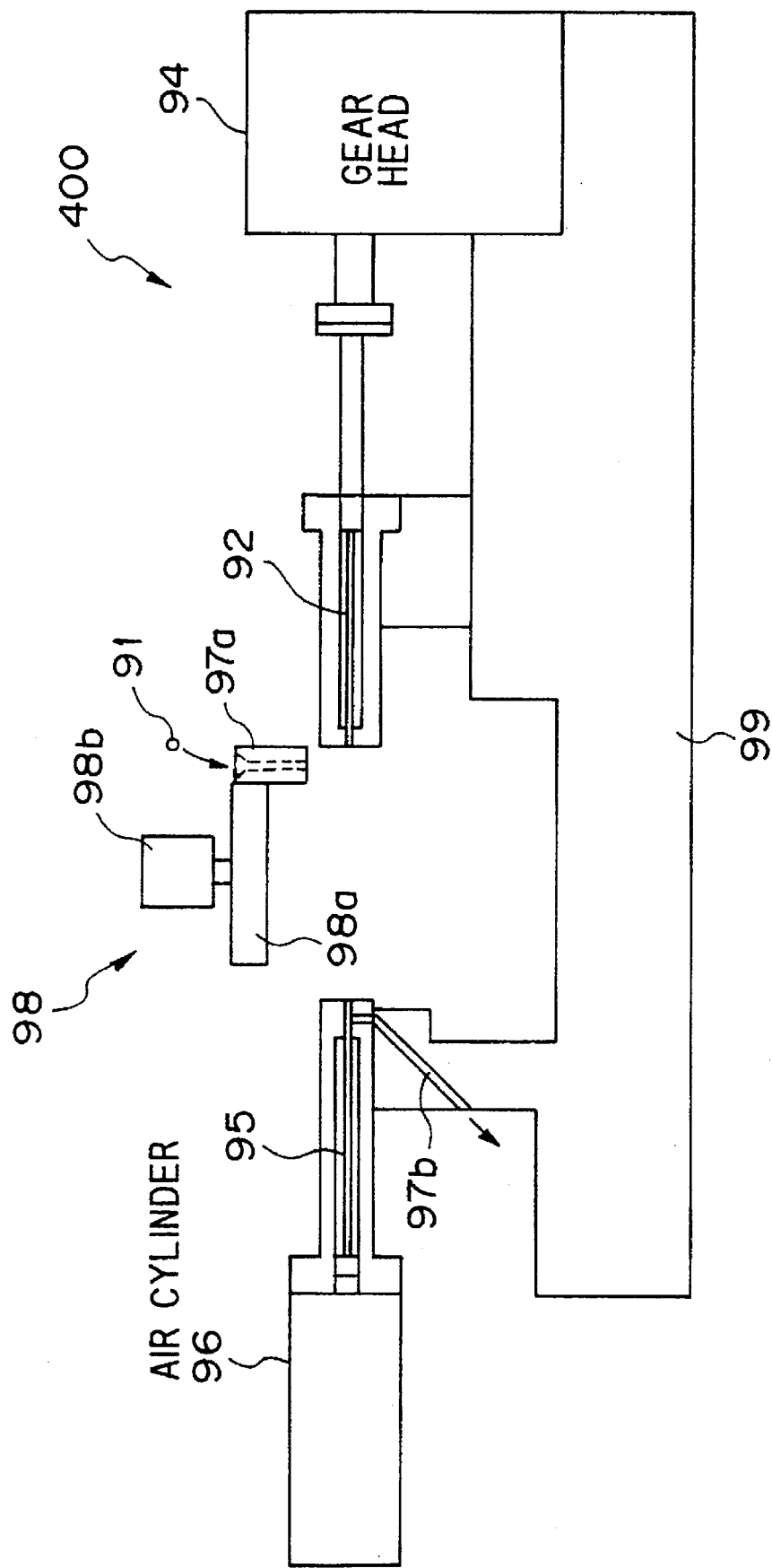

FIG. 21A (PRIOR ART)
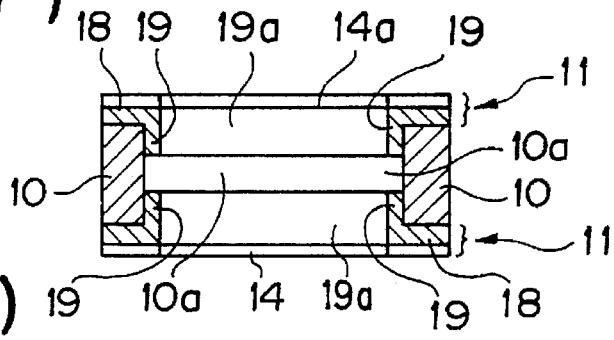
FIG. 21B (PRIOR ART)
FIG. 21C (PRIOR ART)
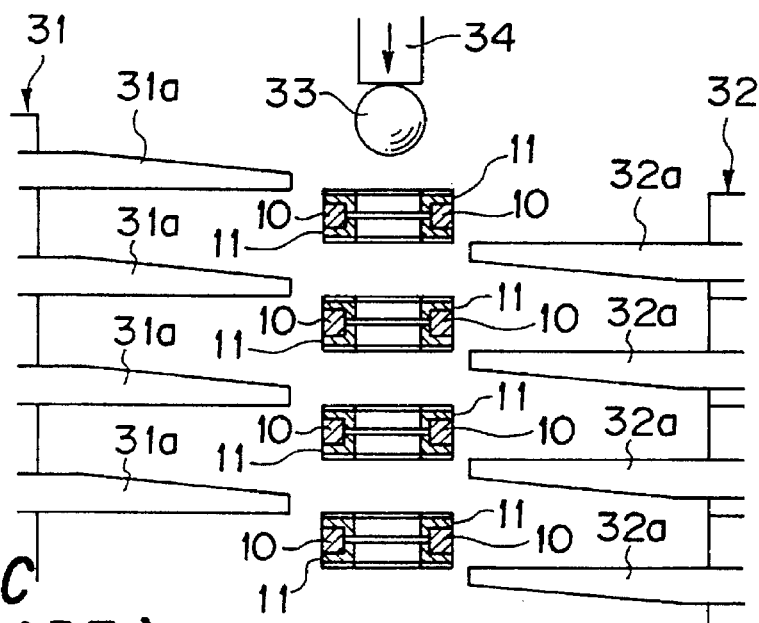
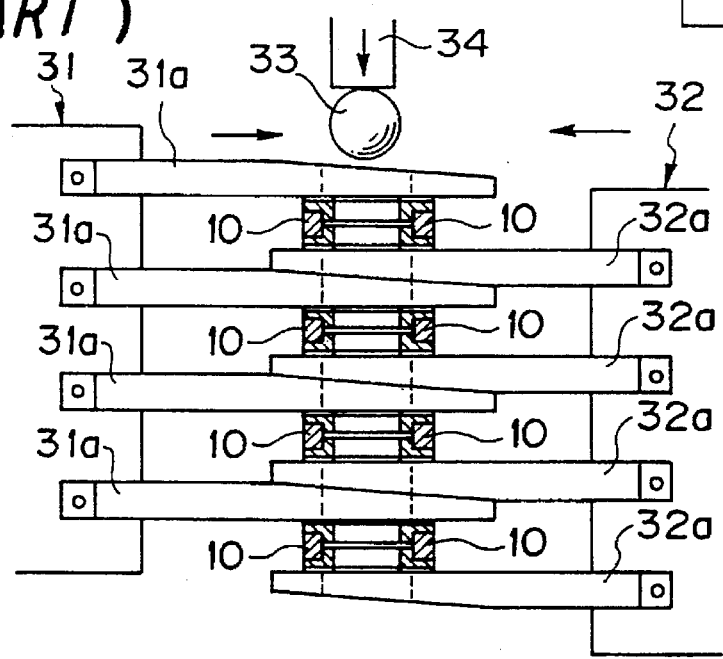

MAGNETIC HEAD ARM, METHOD OF PRODUCING THE SAME AND APPARATUS FOR PRODUCING THE SAME

BACKGROUND OF THE INVENTION

The present invention relates to a magnetic head arm composed of magnetic head assemblies which are attached to an actuator assembly, a method of producing a magnetic head arm and an apparatus for producing a magnetic head arm and, more particularly, to a magnetic head arm which can respond to the increasing enhancement of the recording density of a magnetic disk apparatus and which have a high reliability, a method of producing such a magnetic head arm and an apparatus for producing such a magnetic head arm.

With a recent development of small-size and high-density magnetic disk apparatuses, the size of a magnetic head assembly for carrying a magnetic head has been reduced and in recent magnetic head assemblies, a signal pattern is formed on a suspension. Therefore, prevention of a breakage of a signal pattern during assembly is demanded. In addition, an improvement of the accuracy in mounting a magnetic head is demanded in order to realize a high recording density.

In a magnetic disk apparatus, a magnetic head is disposed on a single or both sides of each of a predetermined number of magnetic disks. A magnetic head is mounted on the end of a suspension, and the suspension is attached to the end of a carriage arm of an actuator assembly. Therefore, it is possible to position the carriage arm and, hence, the magnetic head at a desired position by moving the carriage arm in the radial direction of the magnetic disk by driving the actuator of the actuator assembly.

FIG. 17 is a plan view of the interior of a magnetic disk apparatus, and the reference numeral 1 represents a cover, and 2 a base. A spindle mechanism 3 is provided with a predetermined number of magnetic disks 4 which are arranged at predetermined intervals as recording media. An actuator assembly 6 which is freely rotated around a rotary shaft 5 is provided in the vicinity of the magnetic disk 4. In the actuator assembly 6, one side of the rotary shaft 5 is a driving portion (actuator) 7, and the other side is a carriage arm 8. The driving portion 7 is provided with a voice coil 9 for constituting a voice coil motor. The same number of carriage arms 8 as the number of magnetic disks 4 are provided and a magnetic head assembly 11 is attached to both sides or a single side of an engaging portion 10 at the forward end of the carriage arm 8 so as to position a magnetic head 13 at a predetermined position in the radial direction of the magnetic disk 4. The block composed of the actuator assembly 6 with the magnetic head assemblies 11 attached thereto is called a magnetic head arm.

FIG. 18A is a perspective view of the magnetic head assembly 11. The magnetic head assembly 11 has a suspension 12 produced by bending a sheet of a metal such as stainless steel at a predetermined angle, and the magnetic head 13 is fixed to the forward end of the suspension 12 by an adhesive. A caulking hole 14a is formed at a mounting portion 14 on the rear end of the suspension 12. A signal pattern 15 for transmitting record reproducing signals to the magnetic head 13 is formed on the suspension 12, and the forward end of the signal pattern 15 is connected to a terminal of the magnetic head 13. A lead terminal portion 16 is provided on the side portion of the mounting portion 14 of the suspension 12. The suspension 12 is further provided with a pin hole HL for receiving a positioning pin (not shown) when the magnetic head assembly 11 is attached to the actuator assembly 6.

The signal pattern 15 is composed of an insulation film 12b formed on the substrate 12a of the suspension 12, four conductive patterns (signal patterns) 15 formed on the insulation film 12a by, for example, etching copper (Cu) or the like, and an insulating protective film 12c (at most several μm) formed on the insulation film 12b. A dummy pattern 17 is formed from a metal film having the same thickness as the protective film 12c on the portion other than the caulking hole 14a and the signal pattern 15 at the rear end portion of the suspension 12. A spacer 18 having a predetermined thickness is welded to the back surface of the mounting portion 14 at the rear end of the suspension 12 by spot welding by a laser or the like, as shown in FIG. 18C. A cylindrical protruding portion 19 is provided at the center of the spacer 18, and a through hole 19a formed in the protruding portion 19 communicates with the caulking hole 14a. When the magnetic head assembly 11 is attached to the carriage arm 8 of the actuator assembly 6, the protruding portion 19 fits into an insertion hole formed on the forward end of the carriage arm 8, as will be described later.

FIG. 19 is a plan view of the actuator assembly 6, and FIG. 20 is a perspective view thereof. The actuator assembly 6 is composed of a plurality of carriage arms 8 each of which is rotated around the rotary shaft 5 and the driving portion (actuator) 7, and an insertion hole 10a for attaching the magnetic head assembly 11 to both sides or a single side of the carriage arm 8 therethrough is provided at an engaging portion 10 at the forward end of each carriage arm 8. The driving portion 7 has the voice coil 9 provided on a coil support plate 7a and a flexible printed circuit board (FPC) 7c supported by a fixing portion 7b. The reference numeral 7d denotes a keep plate.

FIGS. 21A to 21C are explanatory views of the process of attaching the magnetic head assembly 11 to the carriage arm 8. FIG. 21A is a sectional view of the engaging portion 10 of the carriage arm 8 and the mounting portion 14 of the suspension 12 with the magnetic head assembly 11 attached to the carriage arm 8. The cylindrical protruding portions 19 (FIG. 18C) of the magnetic head assemblies 11 are fit into the insertion hole 10a formed in the engaging portion 10 of each carriage arm 8 from both sides of the insertion hole 10a, thereby producing an inlay portion clamps 31, 32 which are movable to both sides of the thus-produced inlay portion are provided, as shown in FIG. 21B. Each of the clamps 31, 32 is provided with a plurality of presser portions 31a (32a) which are arranged in the form of the teeth of a comb, and the upper surface of the presser portion 31a and the under surface of the presser portion 32a are tapered. When the presser portions 31a and 32a come into contact with each other, both tapered surfaces are in contact. In other words, the presser portions 31a and 32a are disposed in such a manner that when they approach each other, the tapered surface of a presser portion of one clamp comes into contact with the tapered surface of a presser portion of the other clamp and that when they approach each other, the inlay portion is clamped between the under surface of the presser portion 31a and the upper surface of the presser portion 32a.

As a result, when the clamps 31 and 32 move, the presser portions 31a, 32a are inserted between the engaging portions 10 of every two adjacent carriage arms 8 with the tapered surfaces in contact with each other, thereby vertically holding the engaging portions 10 in a fixed state, as shown in FIG. 21C.

In this state, a caulking ball 33 is pressed from above into the through hole 19a of the cylindrical protruding portion 19 with a caulking pin 34 through the caulking hole 14a of the magnetic head assembly 11. As the caulking ball 33 is pressed into the through hole 19a, the cylindrical protruding portion 19 is expanded so as to press the inner wall of the insertion hole 10a of the carriage arm 8. In this way, the magnetic head assemblies 11 are secured to the forward ends of the carriage arms 8, thereby producing a magnetic head arm.

In the conventional method of attaching a magnetic head assembly, the inlay portion is clamped between the under surface of the presser portion 31a and the upper surface of the presser portion 32a in order to hold the inlay portion in a fixed state. However, in order to clamp the inlay portion, the presser portions 31a, 32a slide on the surfaces of the mounting portion 14 at the rear end of the magnetic head assembly 11. Since the signal pattern 15 is formed on the upper surface of the mounting portion 14, the protective film 12c and the signal pattern 15 are unfavorably scratched by the surface protrusions of the presser portions 31a, 32a, or fine dust adhered to the surfaces of the presser portions 31a, 32a when they slide on the surfaces of the mounting portion 14. The scratch may lead to a signal error, and in the worst case, the sliding operation of the presser portions 31a, 32a scrapes the protective film 12c and cuts the signal pattern 15.

SUMMARY OF THE INVENTION

Accordingly, it is an object of the present invention to eliminate the above-described problems in the prior art and to provide a method of producing a magnetic head arm, and an apparatus for producing a magnetic head arm which can prevent the surface of a magnetic head assembly from being rubbed when the inlay portion of a magnetic head assembly and an actuator assembly is held in a fixed state, and to provide a magnetic head arm produced by the method and the apparatus.

It is another object of the present invention to provide a method of producing a magnetic head arm, and an apparatus for producing a magnetic head arm which can produce a magnetic head arm without scratching a signal pattern when a magnetic head assembly is attached to an actuator assembly, in other words, which can produce high-quality magnetic head arms with a good yield, and to provide a magnetic head arm produced by the method and the apparatus.

To achieve these ends, in a first aspect of the present invention, there is provided a method of producing a magnetic head arm by attaching magnetic head assemblies to an actuator assembly provided with carriage arms and a driving portion for driving the carriage arms, comprising the steps of: (1) disposing an inlay portion produced by fitting a mounting portion of a magnetic head assembly into an insertion hole formed at the forward end of a carriage arm, between every two adjacent first members having a V-shaped slit; (2) pushing a second member into the V-shaped slit of each first member; (3) pressing the magnetic head assembly against the carriage arm by the expanding force of the slit portions of each first member which is produced in proportion to the amount of insertion of the second member and holding the magnetic head assembly in a fixed state; and (4) caulking the inlay portion, with the magnetic head assembly being held by the carriage arm, so as to attach the magnetic head assembly to the carriage arm.

In a second aspect of the present invention, there is provided a magnetic head arm comprising: magnetic head assemblies; and an actuator assembly which includes carriage arms and a driving portion for driving the carriage arms and to which the magnetic head assemblies are attached, characterized in that the magnetic head arm is produced by a method comprising the steps of: (1) disposing an inlay portion produced by fitting a mounting portion of a magnetic head assembly into an insertion hole formed at the forward end of a carriage arm, between every two adjacent first members having a V-shaped slit; (2) pushing a second member into the V-shaped slit of each first member; (3) pressing the magnetic head assembly against the carriage arm by the expanding force of the slit portions of each first member which is produced in proportion to the amount of insertion of the second member and holding the magnetic head assembly in a fixed state; and (4) caulking the inlay portion, with the magnetic head assembly being held by the carriage arm, so as to attach the magnetic head assembly to the carriage arm.

In a third aspect of the present invention, there is provided an apparatus for producing a magnetic head arm by attaching magnetic head assemblies to an actuator assembly provided with carriage arms and an actuator for rotating the carriage arms, the apparatus comprising: (1) a plurality of first members each having a V-shaped slit for clamping an inlay portion produced by fitting a protruding portion of the magnetic head assembly into an insertion hole formed at the forward end of the carriage arm; (2) a plurality of second members each of which is pushed into the V-shaped slit of the corresponding first member and expands the slit portions of the first member in proportion to the amount of insertion of the second member so as to press the magnetic head assembly against the carriage arm and hold the magnetic head assembly in a fixed state; and (3) a caulking machine for caulking the inlay portion by inserting a caulking member into a through hole formed in the protruding portion of the magnetic head assembly, which has been fitted into the insertion hole, so as to attach the magnetic head assembly to the actuator assembly.

Other features and advantages of the present invention will be apparent from the following description taken in conjunction with the accompanying drawings.

BRIEF DESCRIPTION OF THE DRAWINGS

FIGS. 4A, 4B and 4C show the structure of a lower wedge;

FIGS. 5A and 5B show the structure of an upper wedge;

FIG. 11 is a plan view of a caulking machine;

FIG. 12 is an elevation view of the caulking machine;

FIGS. 21A, 21B and 21C are explanatory views of a conventional process of attaching the magnetic head assemblies to the carriage arms.

DESCRIPTION OF THE PREFERRED EMBODIMENTS

(A) Schematic Explanation of the Invention

Figure 1A:
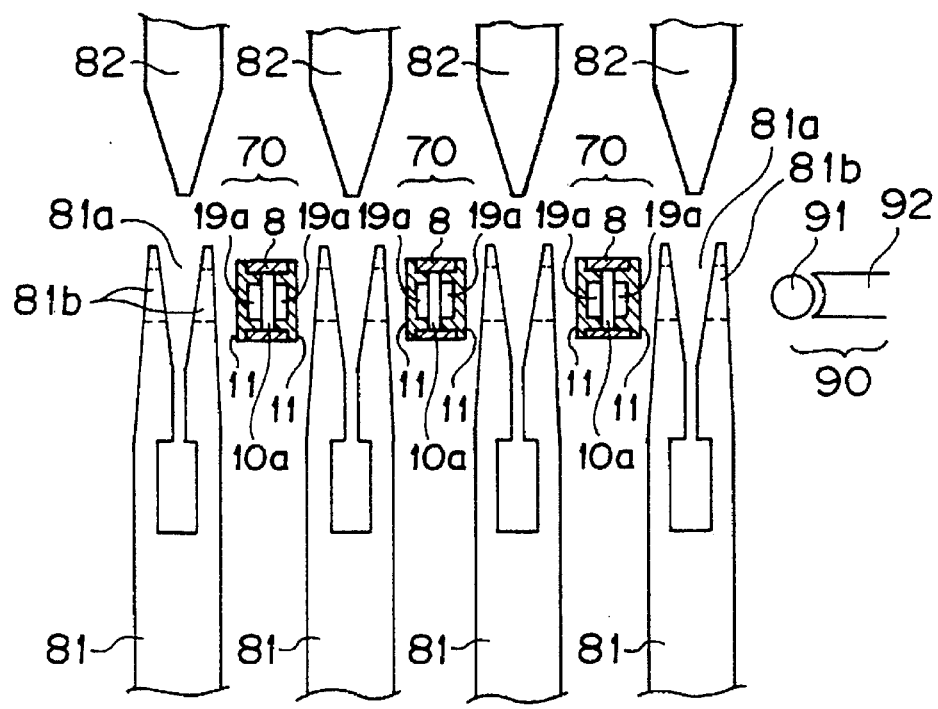
FIGS. 1A and 1B are schematic explanatory views of the principle of the present invention.

FIG. 1 is a schematic explanatory view of the present invention. The reference numeral 8 represents a carriage arm of an actuator assembly, 11 a magnetic head assembly, 70 an inlay portion produced by fitting a protruding portion 19 of the magnetic head assembly 11 into an insertion hole 10a at the forward end of the carriage arm 8, 81 a first member having a V-shaped slit, 82 a second member inserted between the slit portion of the first member, 90 a caulking machine, 91 a caulking ball and 91 a caulking pin.

Figure 1B:
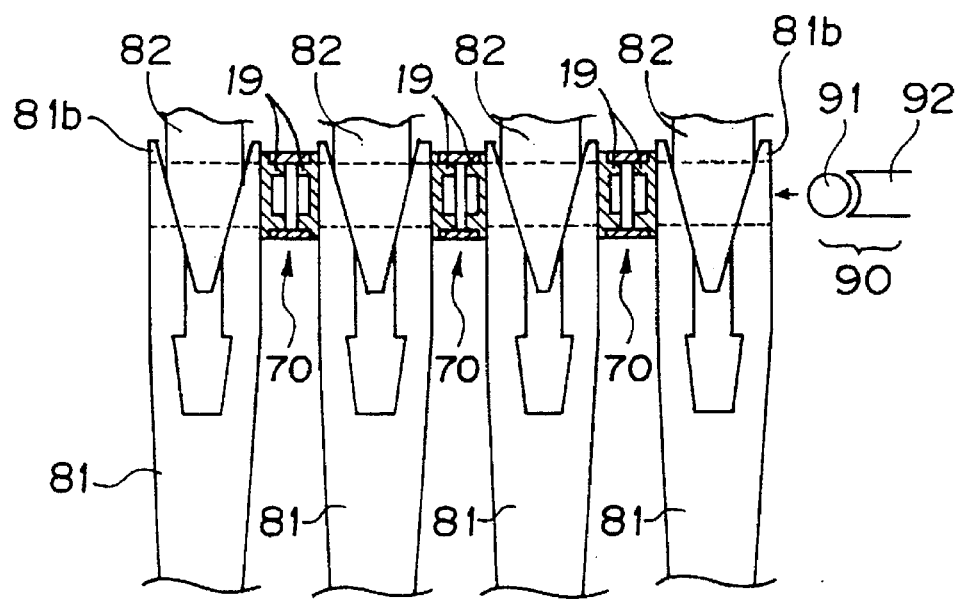

The mounting portion (the protruding portion 19 provided with a through hole 19a) of the magnetic head assembly 11 is fitted into the insertion hole 10a formed at the forward end of the carriage arm 8, and the inlay portion 70 is disposed between every two adjacent first members 81 having a V-shaped slit 81a (see FIG. 1A). A second member 82 is then pushed into the V-shaped slit 81a of each first member 81, and the magnetic head assembly 11 is pressed against the carriage arm 8 by the expanding force of the slit portions 81b of the first member 81 which is produced in proportion to the amount of insertion of the second member 82 so as to secure and hold the magnetic head assembly 11 by the carriage arm 8 (see FIG. 1B). In this magnetic head assembly holding state, the caulking ball 91 is pushed into the through hole 19a of the protruding portion 19 with a caulking pin 92, thereby caulking the inlay portion 70.

In this manner, it is possible to press the magnetic head assembly 11 against the carriage arm 8 perpendicularly thereto without rubbing the surface of the magnetic head assembly 11 when the inlay portion 70 of the magnetic head assembly 11 and the carriage arm 8 is held in a fixed state. As a result, the signal pattern of the magnetic head assembly 11 is not scratched, and it is possible to produce high-quality 14 magnetic head arms with a good yield.

(B) Apparatus for producing a magnetic head arm

An apparatus for producing a magnetic head arm according to the present invention is composed of:

(1) a caulking set holder provided with lower wedges each having a V-shaped slit so as to clamp an inlay portion produced by fitting the cylindrical protruding portion of a magnetic head assembly into the insertion hole at the forward end of a carriage arm;

(2) upper wedges which are pushed into the V-shaped slits of the lower wedges and expand the slit portions of the lower wedges in proportion to the amount of insertion of the upper wedges so as to press the magnetic head assemblies against the carriage arms and hold the magnetic head assemblies in a fixed state; and (3) a caulking machine on which the caulking set holder is mounted and which inserts a caulking member into the through hole formed in the protruding portion of each magnetic head assembly, which has been fitted into the insertion hole, so as to caulk each inlay portion and attach each magnetic head assembly to an actuator assembly.

Figure 18A:
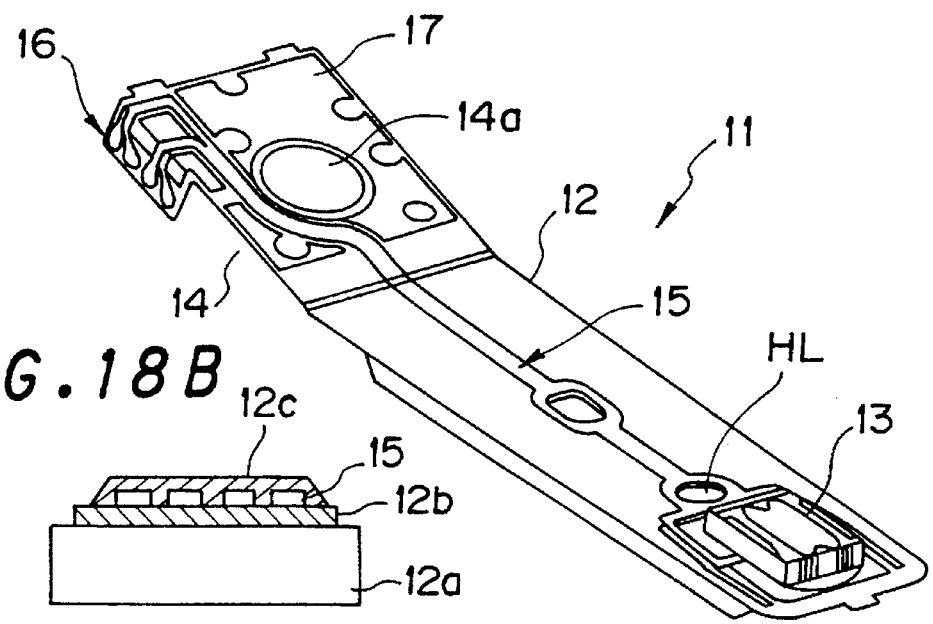
FIG. 18A is a perspective view of a magnetic head assembly in the magnetic disk apparatus.
Figure 18B:
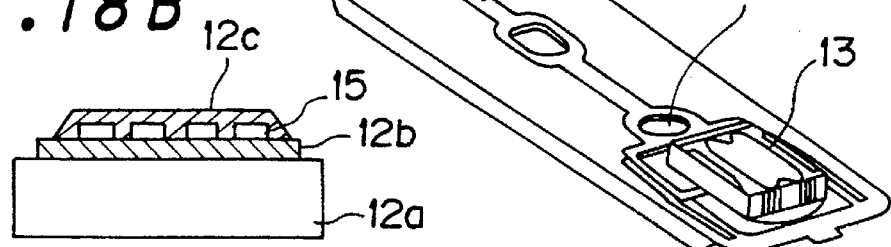
FIG. 18B is an explanatory view of a signal pattern in the magnetic head assembly.
Figure 18C:
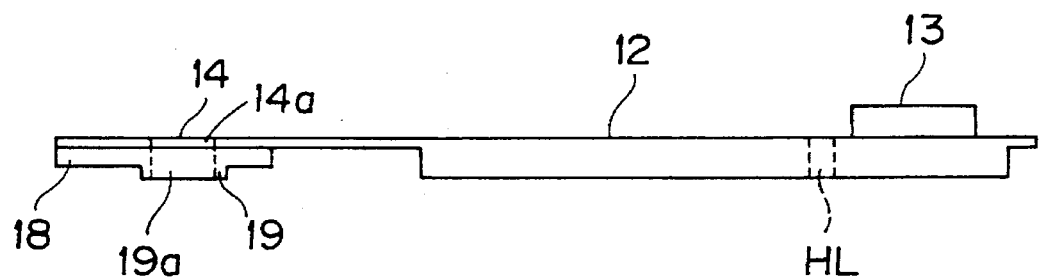
FIG. 18C is a side elevation view of the magnetic head assembly.
Figure 19:
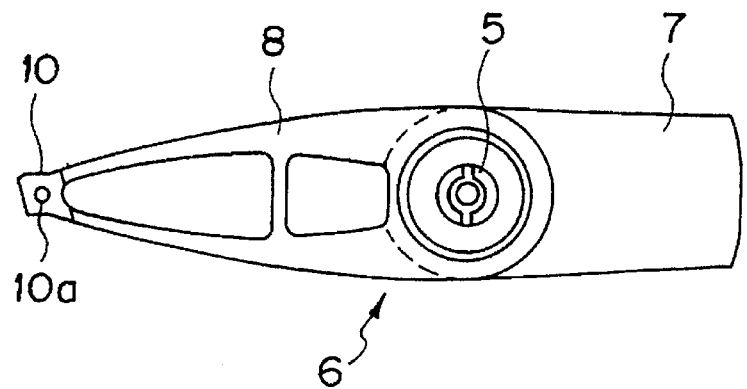
FIG. 19 is a plane view of the actuator assembly in the magnetic disk apparatus shown in FIG. 17.
Figure 20:
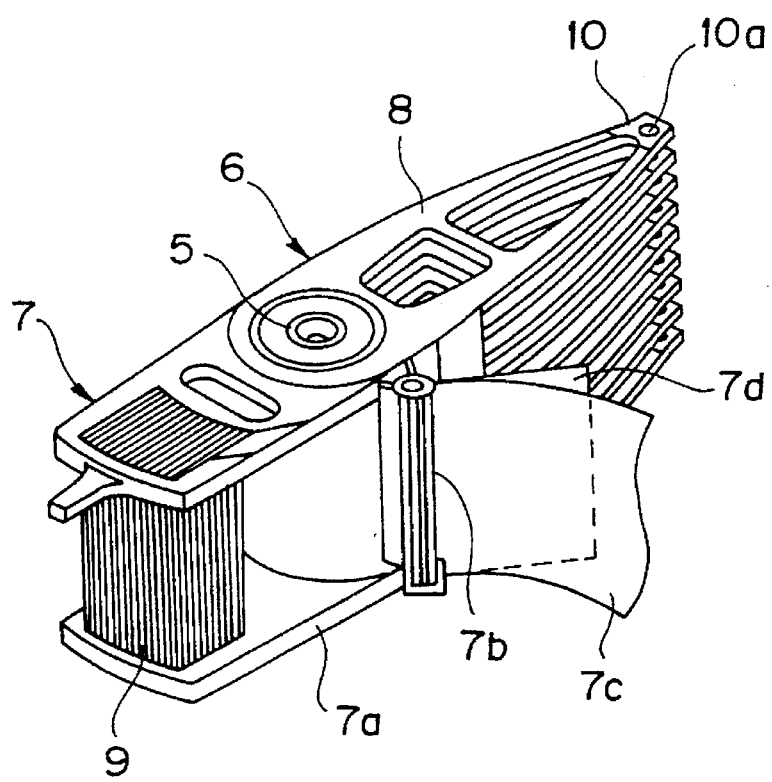
FIG. 20 is a perspective view of the actuator assembly in the magnetic disk apparatus shown in FIG. 17.

The magnetic head assembly in the following explanation is assumed to have the structure shown in FIGS. 18A to 18C. The actuator assembly has the structure shown in FIGS. 19 and 20, and the insertion hole 10a is formed at the forward end 10 of the carriage arm 8.

(a) Caulking Set Holder

Figure 2:
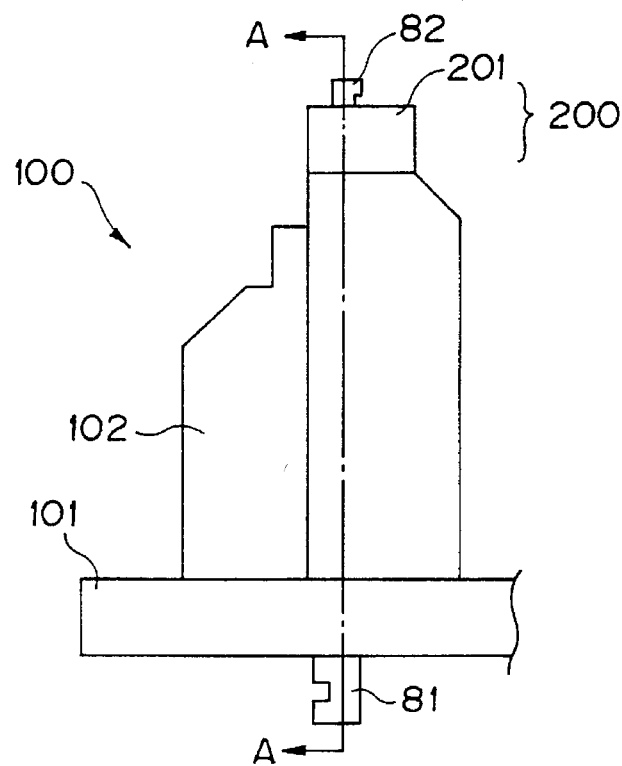
FIG. 2 is a side elevation view of a wedge holding portion of a caulking set holder.
Figure 3:
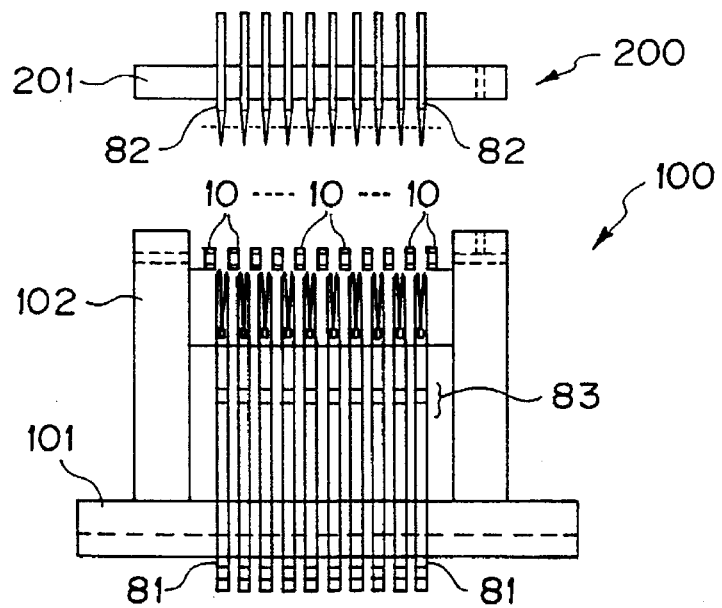
FIG. 3 is an exploded sectional view of the caulking set holder.

FIG. 2 is a side elevation view of a lower wedge holding portion of the caulking set holder, and FIG. 3 is an exploded sectional view of the lower wedge holding portion shown in FIG. 2, taken along the line A—A. The caulking set holder is produced separately from an upper wedge holding portion. In FIG. 2, the upper wedge holding portion is set on the lower wedge holding portion, and in FIG. 3, upper wedges are shown in correspondence with lower wedges.

In FIGS. 2 and 3, the reference numeral 100 represents a caulking set holder, and 200 an upper wedge holding block. In the caulking set holder 100, the reference numeral 81 represents a lower wedge having a V-shaped slit, 101 a base portion and 102 a lower wedge holding portion.

In the upper wedge holding block 200, the reference numeral 82 represents an upper wedge and 201 an upper wedge holding portion for holding all the upper wedges as a whole. In FIG. 3, the forward end 10 of the carriage arm 8 when the actuator assembly is mounted on the caulking set holder 100 is shown for convenience of explanation.

A multiplicity of lower wedges 81 are vertically movably arranged at predetermined intervals. The interval at which the lower wedges 81 are arranged is the same as the interval of adjacent carriage arms 8, so that when the lower wedges 81 vertically move, they are inserted between every two adjacent carriage arms 8. Each lower wedge 81 is held at any given vertical position by the elastic force of a spring 83 which is thrust thereinto by a plunger (not shown). Each lower wedge 81 is situated at the position shown in FIG. 3 in the initial state, and when the magnetic head assembly 11 is clamped by the lower wedges 81, they are elevated up to a clamping position by a jig which will be described later. A multiplicity of upper wedges 82 are also vertically movably arranged on the upper wedge holding portion 201 at the same intervals as those of the lower wedges 81.

FIG. 4A is a plan view of the lower wedge 81, FIG. 4B is an elevation view thereof and FIG. 4C is an enlarged view of the main part thereof. The lower wedge 81 has a narrow and long planar shape, and is provided with a V-shaped slit 81a at the forward end. The upper wedge 82 is pushed into the slit 81a from the direction indicated by the arrow and expands the slit portions 81b. Due to the expanding force of the slit portions 81b and the slit portion 81b of the adjacent lower wedge 81, the magnetic head assembly 11 is pressed against the carriage arm 8, and secured and held by the carriage arm 8, as will be described later. A through hole 81c for inserting a caulking member (which will be described later) thereinto is formed at the forward end of the lower wedge 81, grooves 81d, 81e for positioning the lower wedge 81 when it is elevated are provided at the side portion of the lower wedge 81, and a groove 81f which engages a member for lowering the lower wedge 81 is provided at the lower portion of the lower wedge 81.

FIG. 5A is a plan view of the upper wedge 82 and FIG. 5B is an elevation view thereof. The upper wedge 82 has a narrow and long planar shape, and the forward end 82a is cut at an acute angle like an arrowhead so that it enters the V-shaped slit 81a of the lower wedge 81 and expands the slit portions 81b. A slot 82b is formed at the forward end portion 82a of the upper wedge 82 in such a manner as to communicate with the through hole 81c of the lower wedge 81. A caulking member (which will be described later) is inserted into the slot 82b.

Figure 6A:
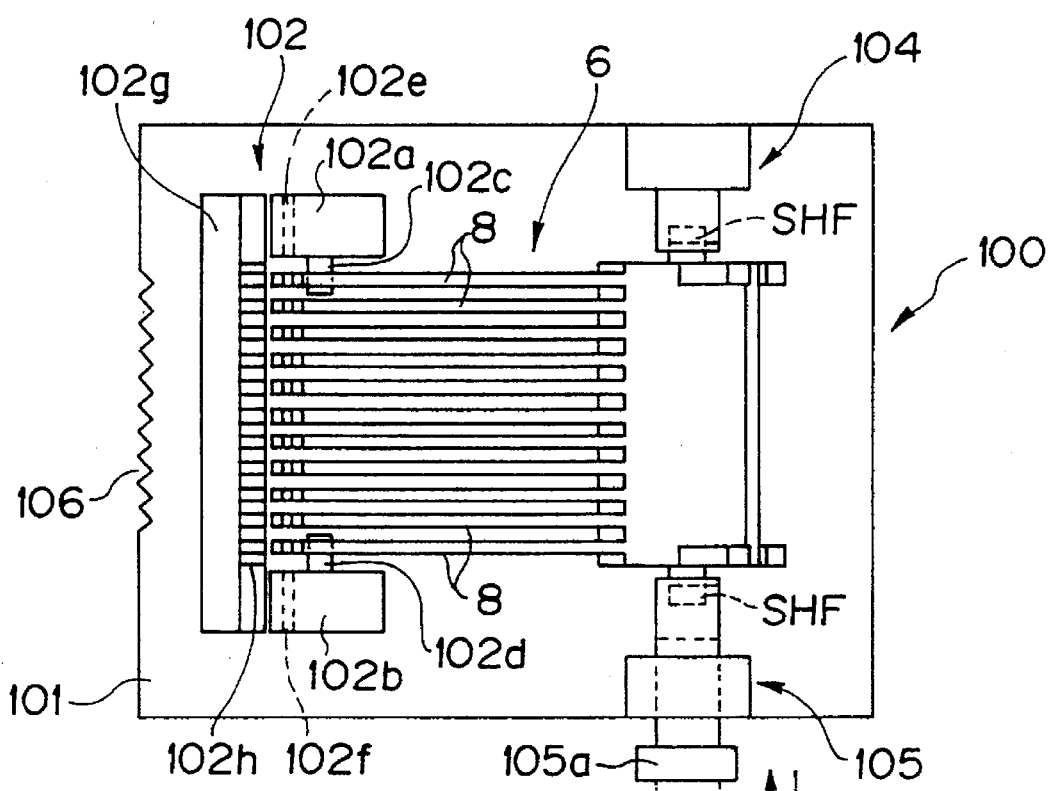
FIGS. 6A and 6B explain the state in which an actuator assembly is mounted on the caulking set holder.
Figure 6B:
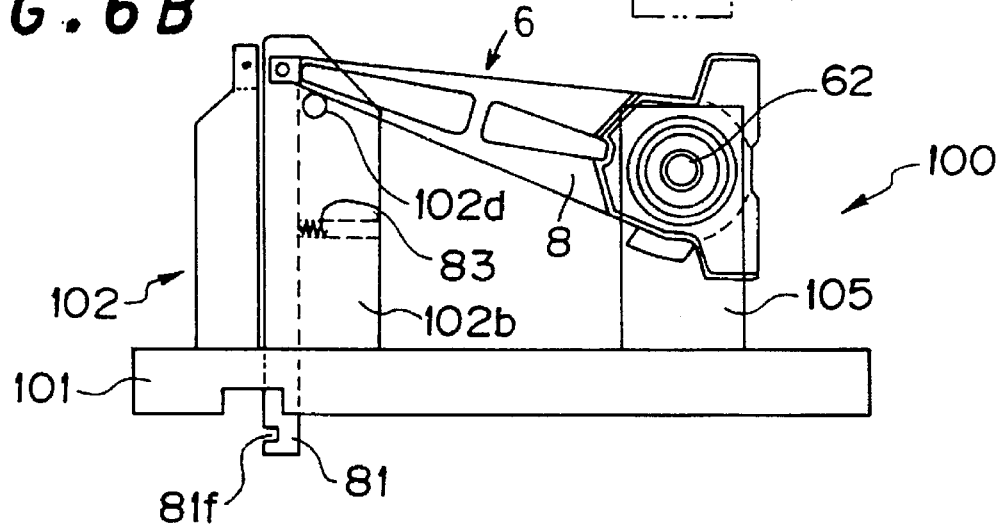

FIG. 6A is a plan view of the caulking set holder 100 on which the actuator assembly 6 is mounted, and FIG. 6B is an elevation view thereof.

The base portion 101 is provided with the lower wedge holding portion 102 and actuator assembly holding portions 104, 105. A positioning rack (V groove) 106 having the same pitch as the lower wedges 81 is provided on the front surface of the caulking set holder 100. Supporting pins 102c, 102d for supporting the carriage arms 8 of the actuator assembly 6, and through holes 102e, 102f into which the caulking member is inserted are provided on both side portions 102a, 102b of the lower wedge holding portion 102. A groove 102h for receiving a magnetic head assembly (not shown) is provided at the portion 102g opposite to the forward ends of the carriage arms 8. The actuator assembly holding portion 105 is provided with a knob 105a which engages a rotary shaft SHF. The knob 105a enables the actuator assembly 6 to be stably held by the caulking set holder 100.

In order to mount the actuator assembly 6 on the caulking set holder 100, the shaft SHF of the actuator assembly 6 is first inserted into the actuator assembly holding portions 104, 105, and the forward end portions of the carriage arms 8 are placed on the supporting pins 102c, 102d. In this state, the knob 105a is turned so as to secure the actuator assembly 6 to the caulking set holder 100.

(b) Set Jig (b-1) Structure

Figure 7A:
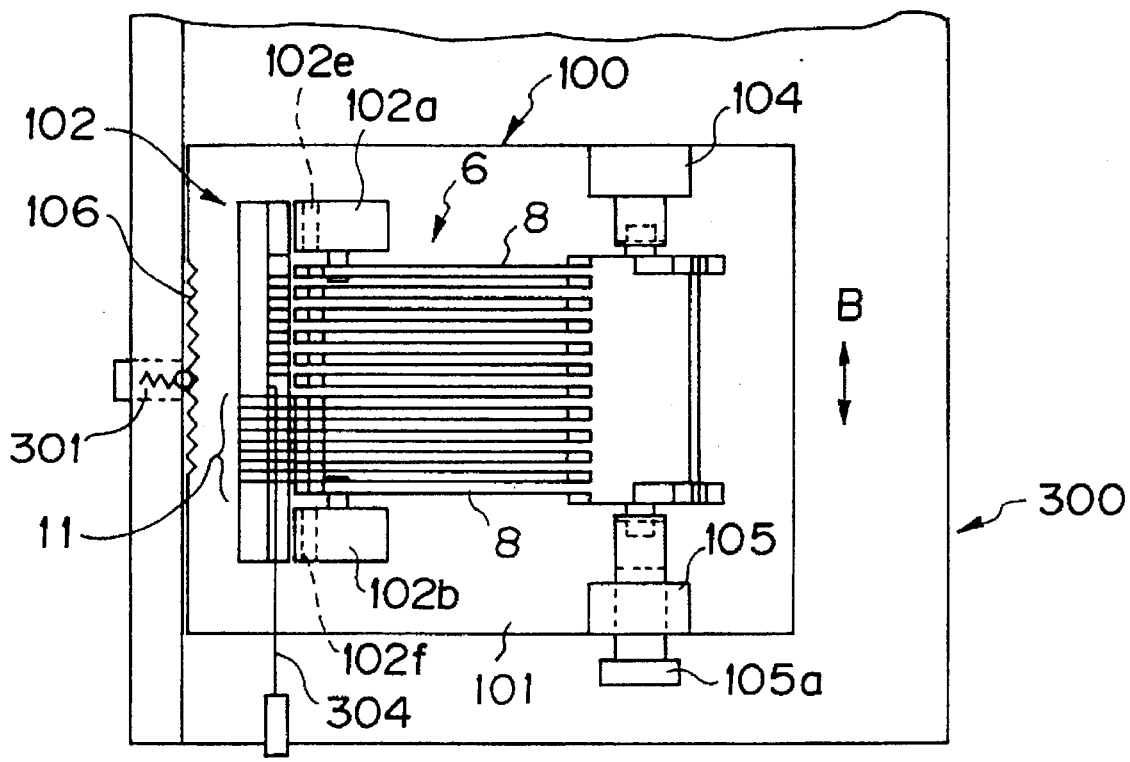
FIGS. 7A and 7B show the structure of a jig on which the caulking set holder is mounted.
Figure 7B:
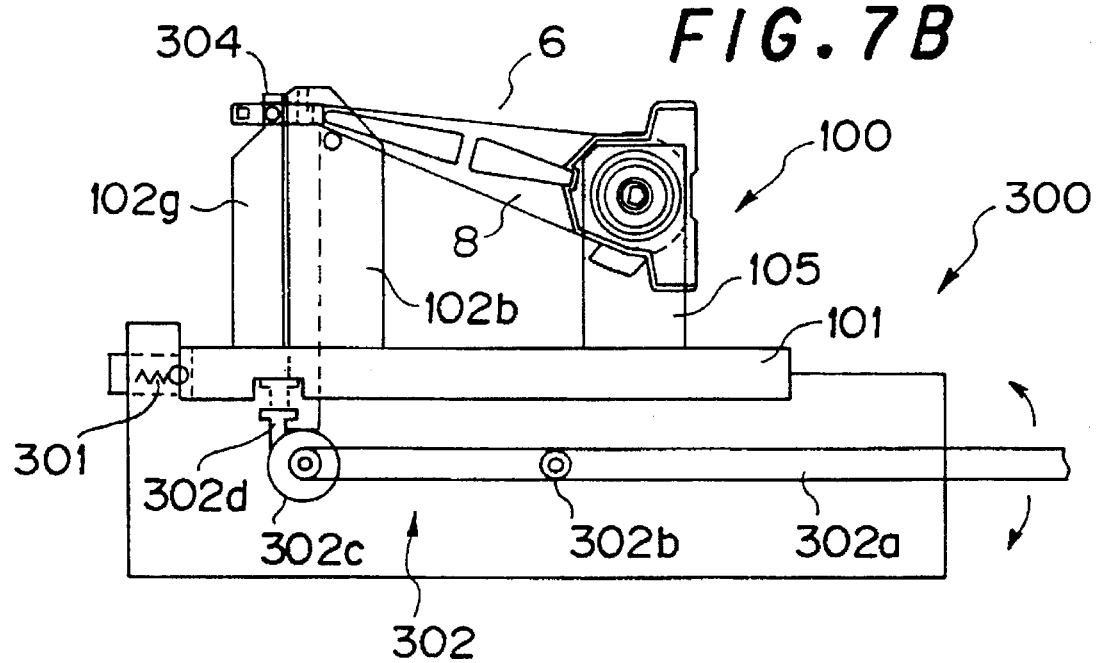
Figure 8:
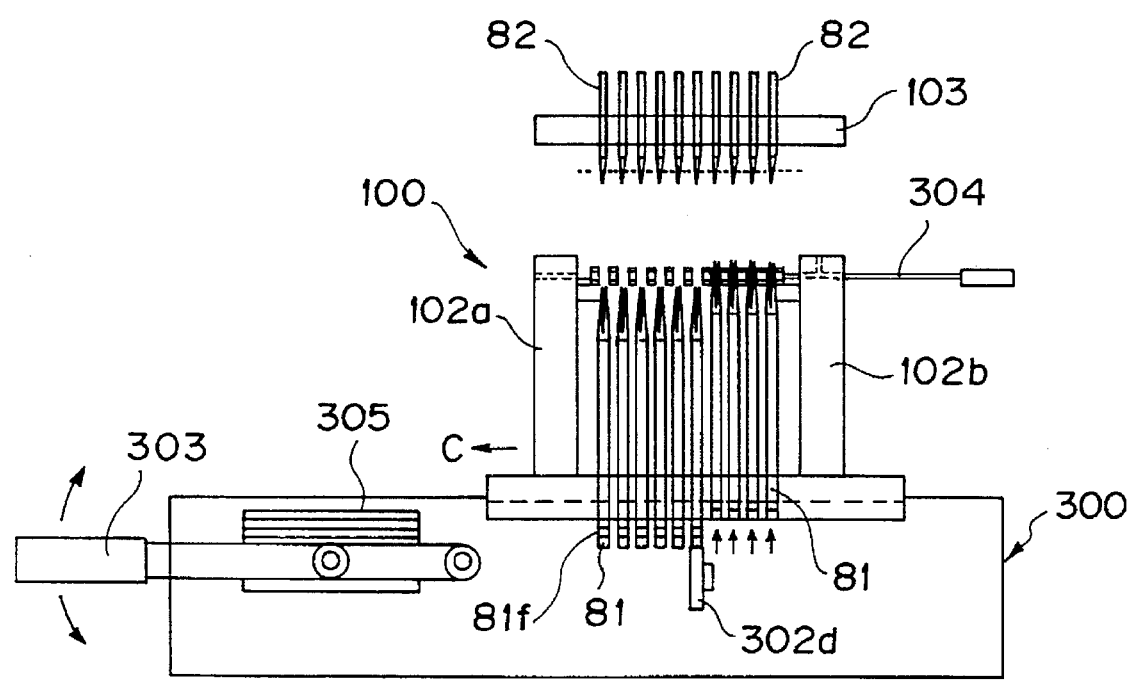
FIG. 8 is a side elevation view of the jig on which the caulking set holder is mounted.

FIG. 7A is a partially plan view of a set jig on which the caulking set holder 100 is mounted, and FIG. 7B is an elevation view thereof. FIG. 8 is a side elevation view of the set jig, in which the portion 102g opposite to the forward ends of the carriage arms 8 is eliminated. The reference numeral 300 represents a jig on which the caulking set holder 100 is mounted in such a manner as to be slidable in the direction indicated by the arrow B. The jig 300 is provided with a plunger 301 for positioning the caulking set holder 100, a lower wedge elevating mechanism 302, a lower wedge lowering lever 303 (FIG. 8), and a positioning pin 304 for the magnetic head assembly 11. In FIGS. 7A, 7B and 8, the cylindrical protruding portion 19 of the magnetic head assembly 11 is fitted into the insertion hole 10a at the forward end of each of the four carriage arms 8 from both sides of the insertion hole 10a, and the inlay portion is clamped by elevating the corresponding four lower wedges 81.

The positioning plunger 301 engages the rack 106 of the caulking set holder 100 so as to adjust the position of the caulking set holder 100. The lower wedge elevating mechanism 302 is provided with a lever 302a, a fulcrum 302b, a roller 302c and a pushing member 302d for pushing up the lower end portion of the lower wedge 81. When the lever 302a is pressed downward in the state shown in FIGS. 7A, 7B and 8, the fifth lower wedge 81 is elevated. Thereafter, when the caulking set holder 100 is moved by one pitch (one tooth) and the lever 302a is pressed downward, the sixth lower wedge 81 is elevated.

A T-shaped bar 305 is integrally rotatably provided with the lower wedge lowering lever 303. When the caulking set holder 100 slides in the direction indicated by the arrow C in FIG. 8, the T-shaped bar 305 enters the groove 81f of the lower wedge 81, In this state, if the lowering lever 303 is rotated clockwise, the T-shaped bar also rotates, thereby lowering the lower wedge 81.

(b-2) Operation

The caulking set holder 100 on which the actuator assembly 6 is mounted is mounted on the jig 300, and the caulking set holder 100 is slid on the Jig 300 so as to engage the lowest tooth of the rack (V groove) 106 with the positioning plunger 301. In this state, the magnetic head assemblies 11 are attached to the carriage arms 8 so as to produce a magnetic head arm. FIGS. 9 and 10 are explanatory views of such an assembly operation.

Figure 9A:
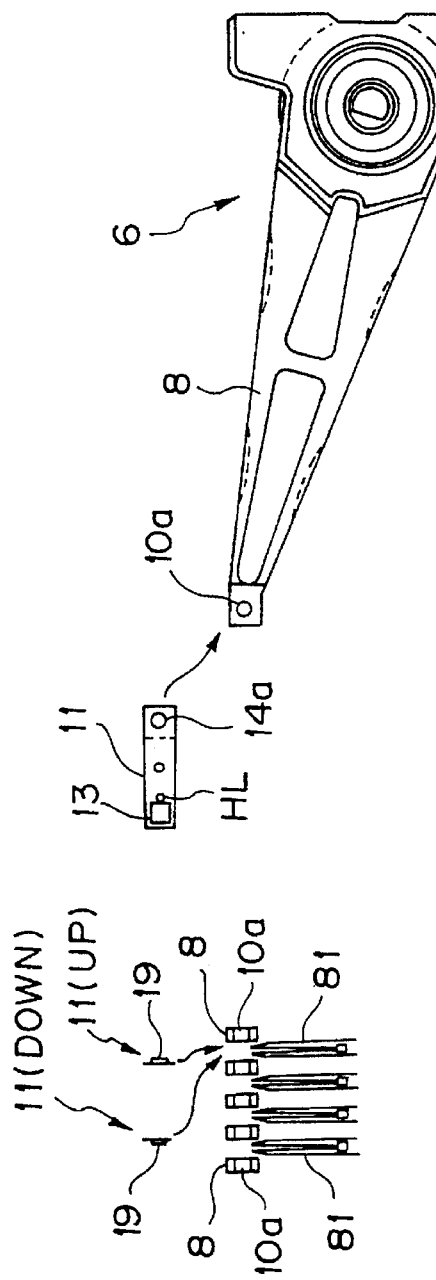
FIGS. 9A and 9B are explanatory views of the operation of attaching a magnetic head assembly to a carriage arm.
Figure 10A:
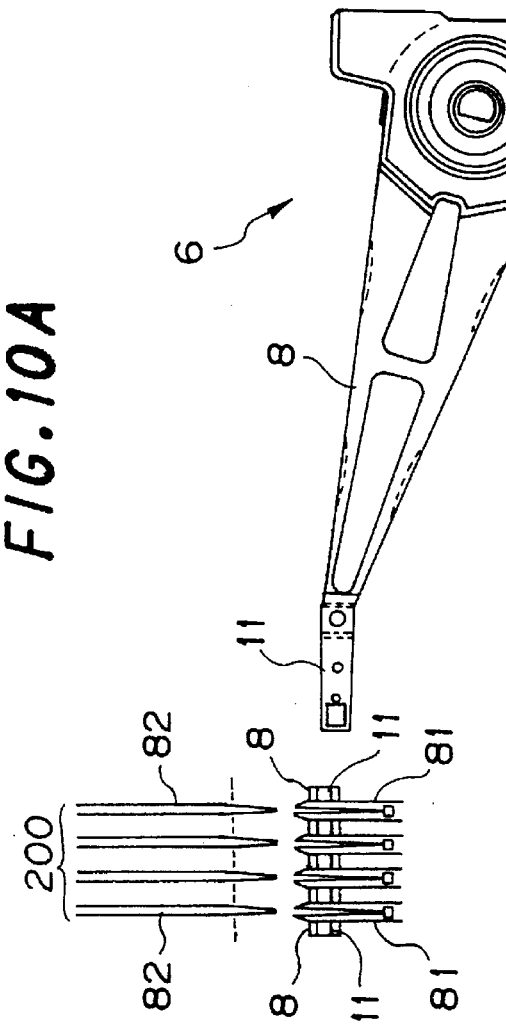
FIGS. 10A and 10B are explanatory views of the operation of attaching the magnetic head assembly to the carriage arm.
Figure 10B:
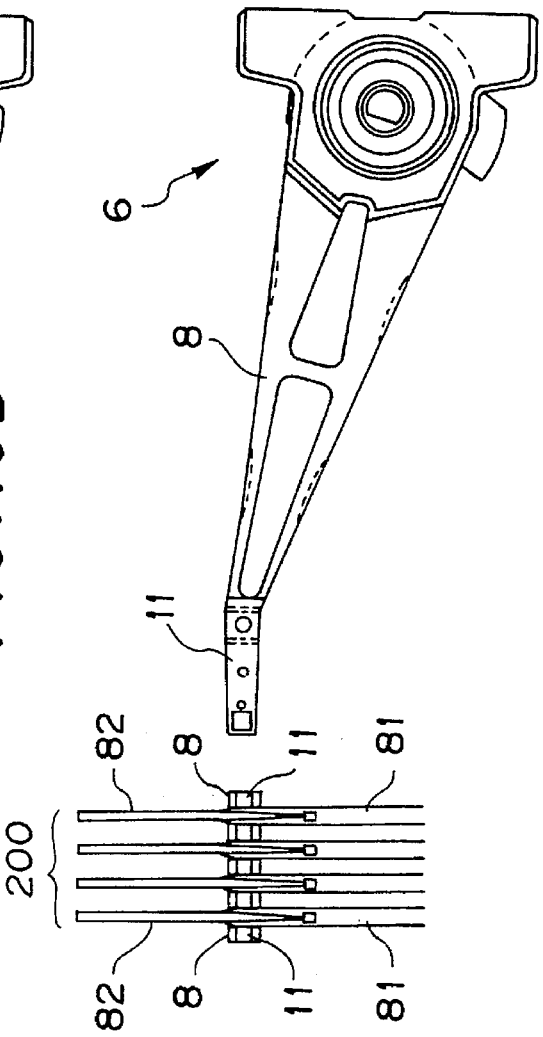

(1) The cylindrical protruding portion 19 of the magnetic head assembly 11 is fitted into the insertion hole 10a formed at the forward end of each carriage arm 8 (FIG. 9A).

(2) The positioning pin 304 (FIG. 7A) is inserted into a pin hole HL of the magnetic head assembly 11 so as to fix the position of the magnetic head assembly 11.

Figure 9B:
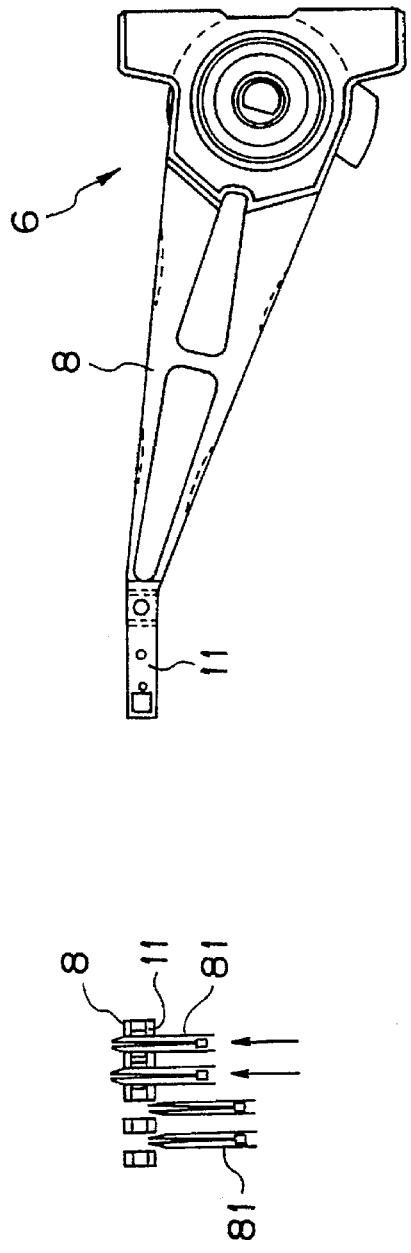

(3) When the magnetic head assemblies 11 situated on both (up and down) sides of the lower wedge 81 are set, the lower wedge 81 is elevated by the lever 302 so as to clamp the magnetic head assemblies 11 (FIG. 9B).

(4) Thereafter, the caulking set holder 100 is slid by one pitch (one tooth). The steps (1) to (4) are repeated, so that the inlay portions of all the magnetic head assemblies 11 and the carriage arms 8 are clamped by the lower wedges 81.

(5) In this state, the upper wedge holding block 200 is set above the caulking set holder 100 (FIG. 10A), and the upper wedge 82 is manually lowered in order to be pushed into the V-shaped slit 81a of the corresponding lower wedge 81. The magnetic head assembly 11 is pressed against the carriage arm 8 by the expanding force of the slit portions 81b of the lower wedge 81 which is produced in proportion to the amount of insertion of the upper wedge 82. In this way, the magnetic head assembly 11 is held in a fixed state by the carriage arm 8 (see FIG. 10B).

In this case, the lower wedge 81 presses each magnetic head assembly 11 against the carriage arm 8 perpendicularly thereto, so that the surface of the magnetic head assembly 11 is not rubbed. As a result, the signal pattern of the magnetic head assembly 11 is not scratched.

(c) Caulking Machine (c-1) Structure

FIG. 11 is a plan view of a caulking machine from which an upper wedge pushing mechanism is removed, and FIG. 12 is a plan view of a caulking machine. The reference numeral 90 represents a caulking machine, 91 a caulking ball, 92 a caulking pin for pushing the caulking ball 92 into the through hole 19a provided in the cylindrical protruding portion 19 of the magnetic head assembly 11, 93 a motor for pushing the caulking pin 92 by a force of 10 to 30 Kg, 94 a gear head having a rack pinion structure for converting the rotation of the motor 93 into a linear motion, 95 a receiving pin for receiving the caulking ball 91, 96 an air cylinder for supplying a constant pressure of about 1 Kg to the receiving pin 95, 97a a caulking ball inserting portion, and 97b a caulking ball discharging portion. The reference numeral 98 represents an upper wedge pushing mechanism, 98a an upper wedge pushing arm, 98b an air cylinder, and 99 a base portion of the caulking machine 90.

Figure 13:
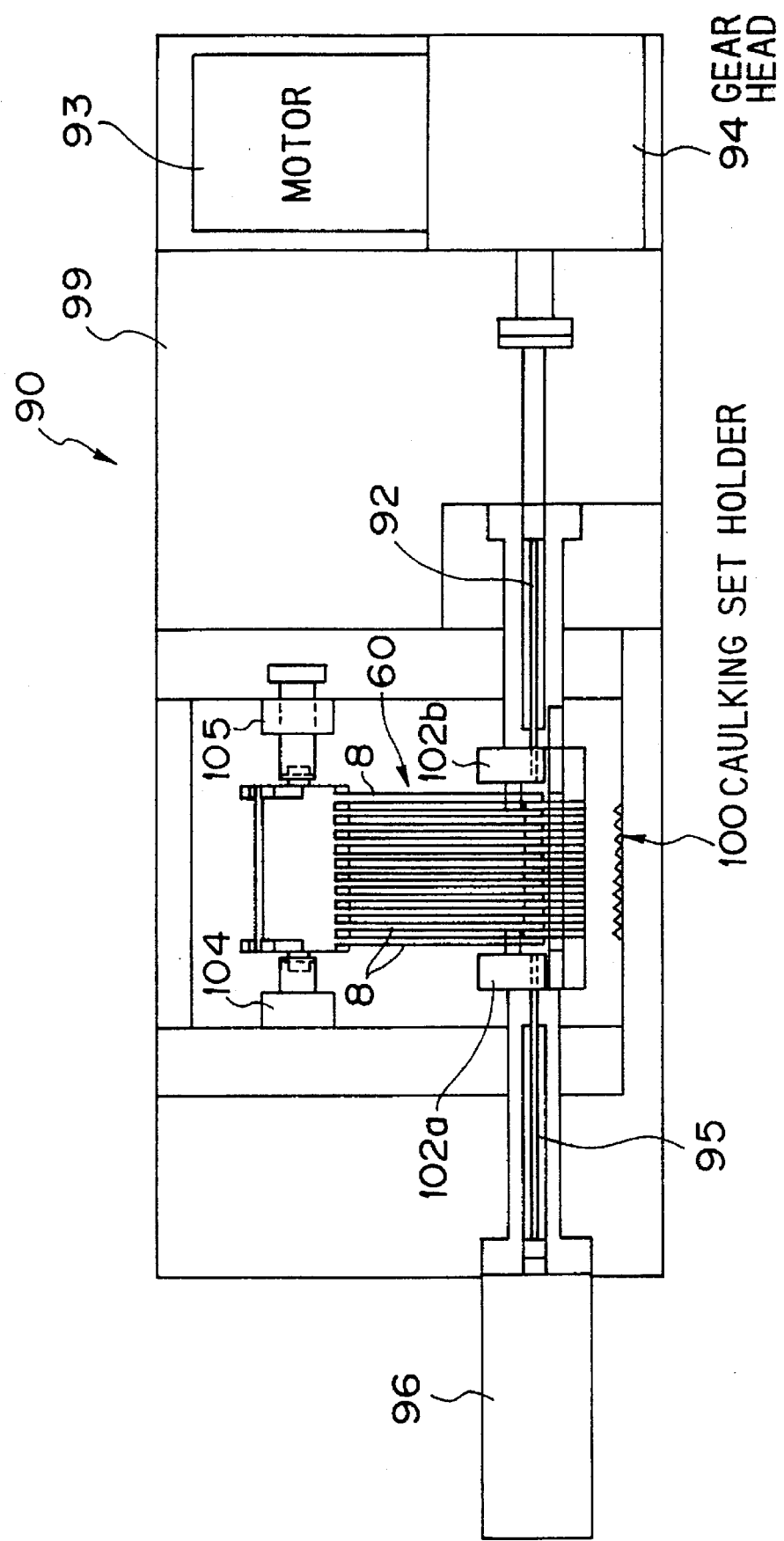
FIG. 13 is an elevation view of the caulking machine on which the caulking set holder is mounted.
Figure 14:
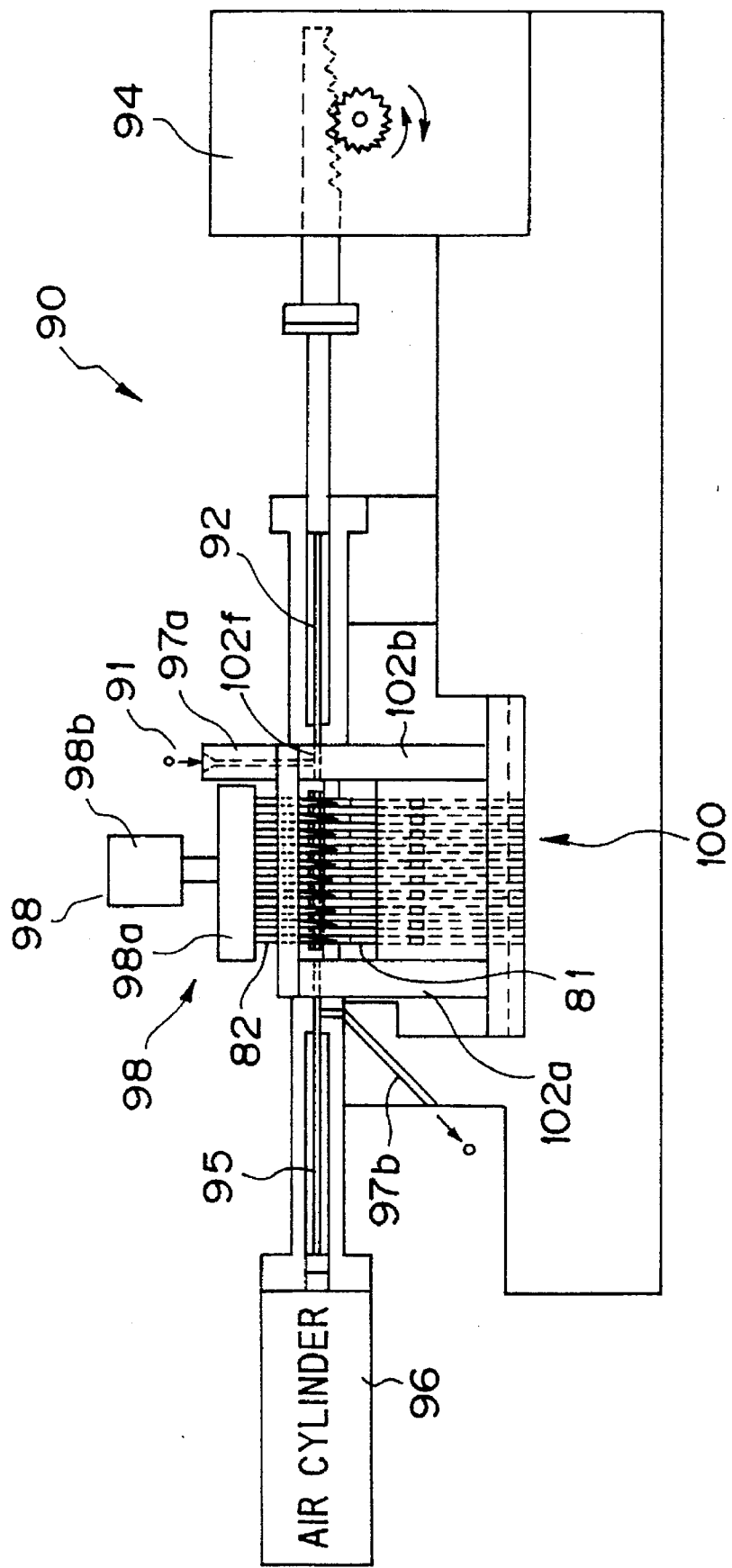
FIG. 14 is an elevation view of the caulking machine in the state in which the upper wedges are pushed.

FIG. 13 is a plan view of the caulking machine 90 on which the caulking set holder 100 is mounted, and FIG. 14 is an elevation view of the caulking machine 90 when the upper wedges 82 are pushed by the upper wedge pushing mechanism 98.

(c-2) Caulking Operation

Figure 15:
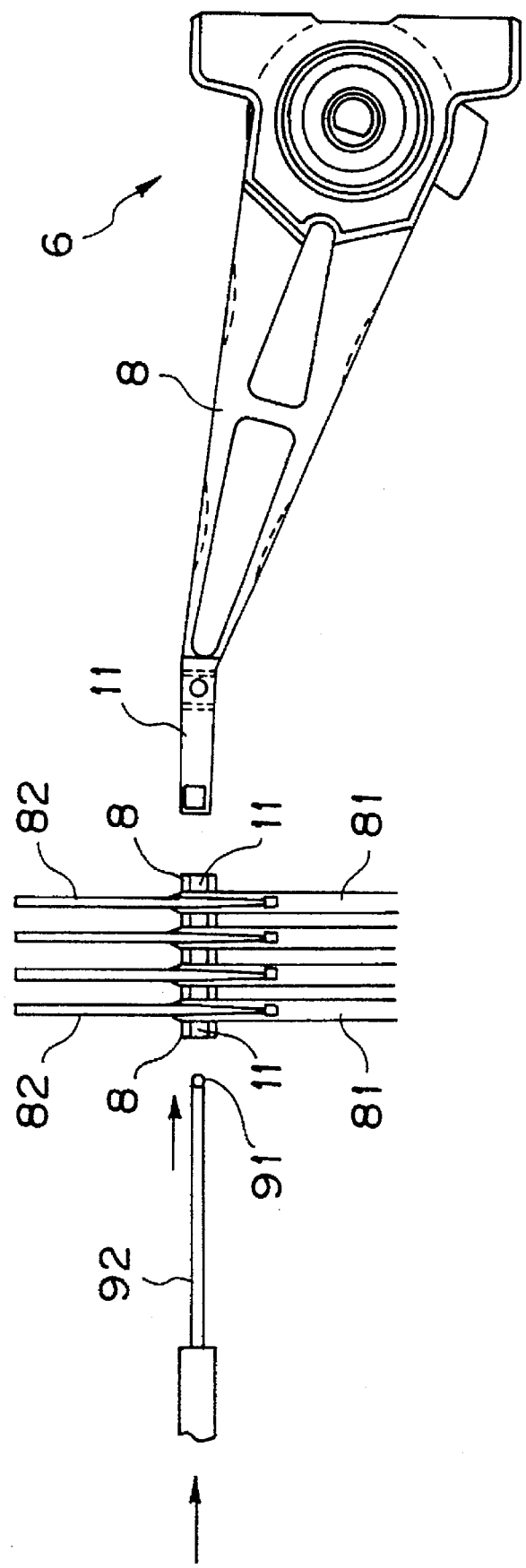
FIG. 15 is an explanatory view of a caulking operation.

The caulking operation for attaching the magnetic head assembly 11 to the carriage arm 8 is as follows. FIG. 15 is an explanatory view of the caulking operation.

(1) The caulking set holder 100 is mounted on the caulking machine 90 while the inlay portions of the magnetic head assemblies 11 and the carriage arms 8 are clamped by the lower wedges 81 and the upper wedges 82 (FIG. 13).

(2) In this state, the upper wedges 82 are pushed with a force of about 2 Kg by the upper wedge pushing mechanism 98 (FIG. 14).

(3) The caulking ball 91 is dropped into the pin hole 102f of the lower wedge holding portion 102b from the caulking ball inserting portion 97a.

(4) The air cylinder 96 is driven so as to advance the receiving pin 95 to the point at which the caulking ball 91 is dropped.

(5) The motor 93 is rotated so as to advance the caulking pin 92, and the caulking ball 91 is clamped by the caulking pin 92 and the receiving pin 95.

(6) The caulking ball 91 is moved by the force (10 to 30 Kg) produced by the rotation of the motor 93, while maintaining the state (5). The caulking ball 91 is pushed into the through hole 19a of the cylindrical protruding portion 19 from the caulking hole 14a of the magnetic head assembly 11. As the caulking ball 91 is pushed into the through hole 19a, the cylindrical protruding portion 19 is expanded and it presses the inner wall of the insertion hole 10a of the carriage arm 8. In this way, the magnetic head assembly 11 is secured to the forward end of the carriage arm 8. Since the diameter D of the caulking ball 91 is larger than the diameter d of the through hole 19a provided in the cylindrical protruding portion 19, caulking is effectively executed.

(7) Subsequently, the caulking ball 91 is serially press-fitted into the through hole 19a of each inlay portion with the caulking pin 92, thereby attaching all the magnetic head assemblies 11 to the carriage arms 8 and producing a magnetic head arm.

Figure 16A:
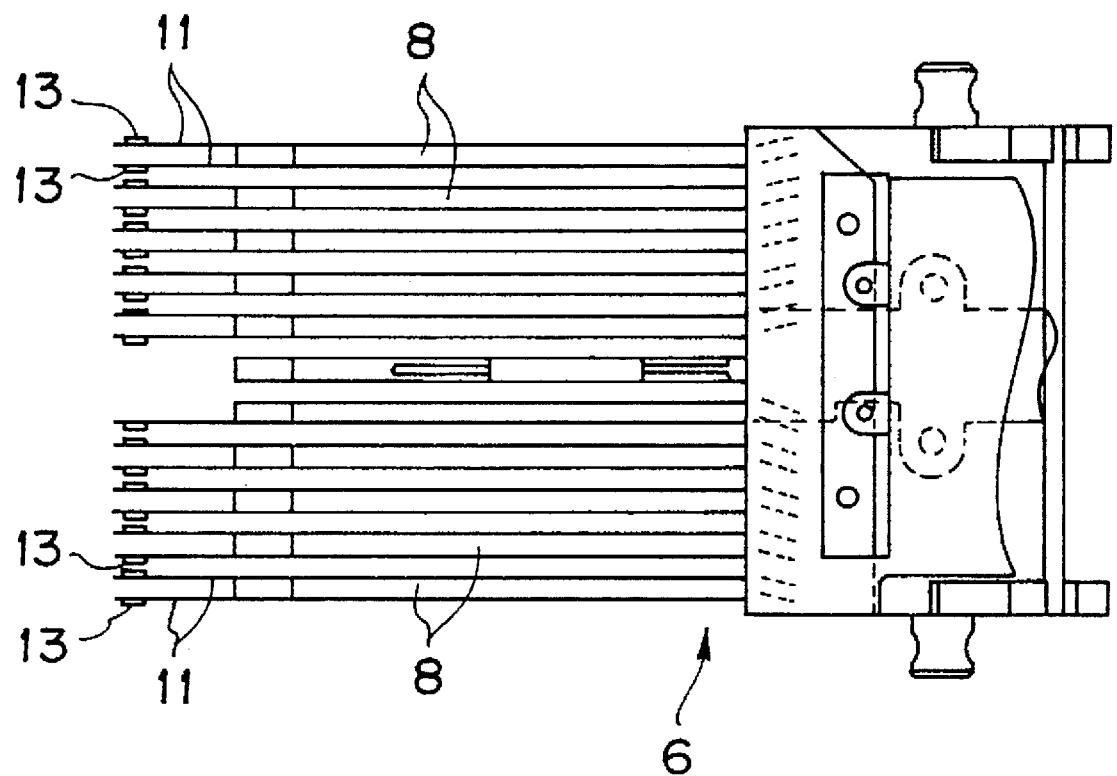
FIGS. 16A and 16B are explanatory view of a magnetic head arm after the magnetic head assemblies are attached to the actuator assembly.
Figure 16B:
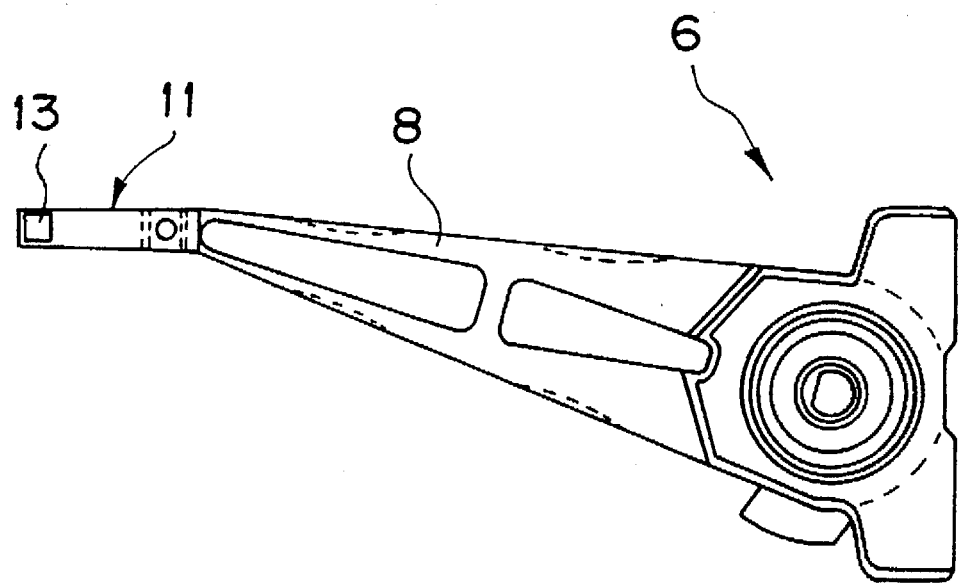
Figure 17:
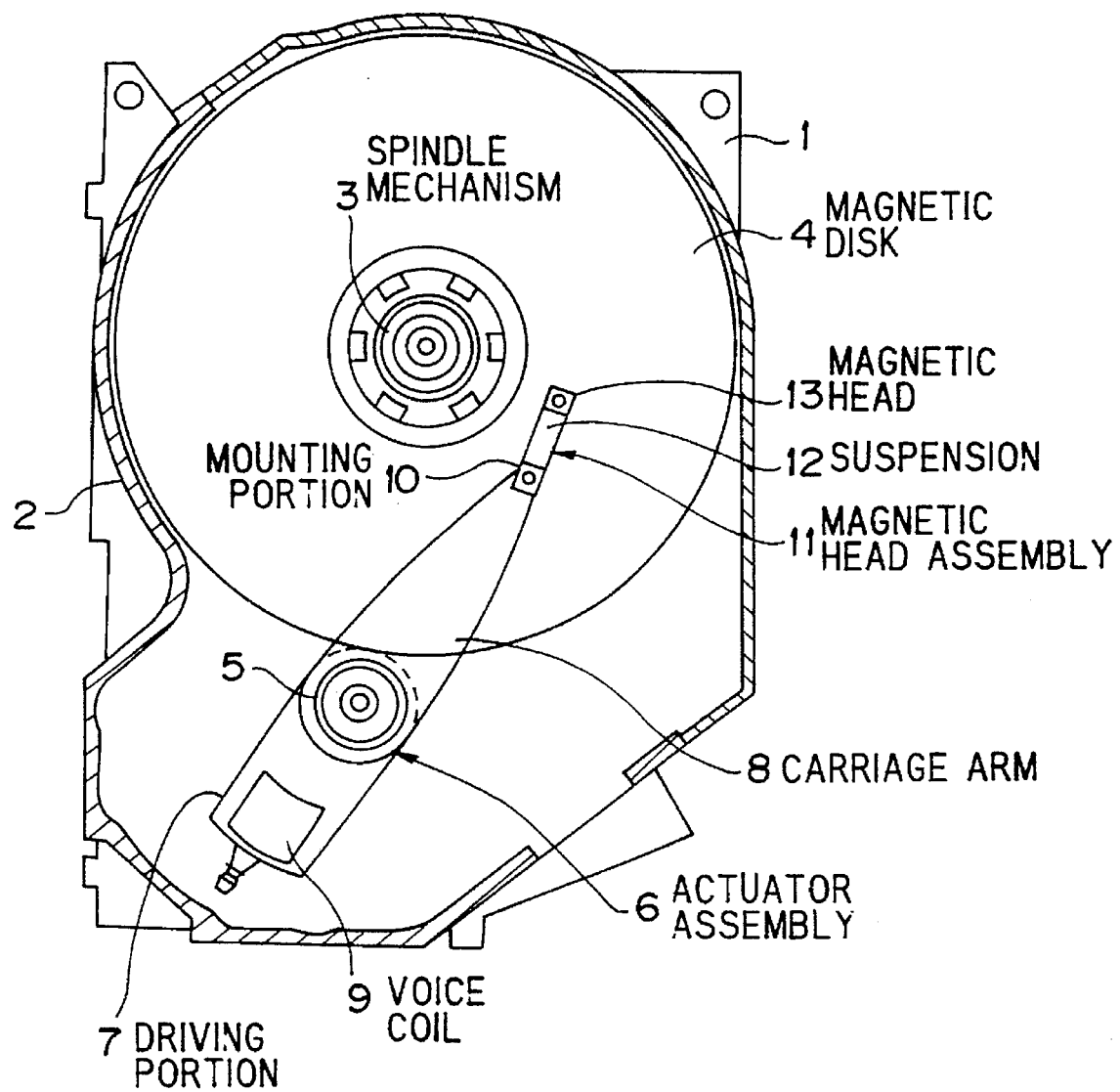
FIG. 17 shows the structure of a magnetic disk apparatus.

FIG. 16 is an explanatory view of a magnetic head arm produced by attaching the magnetic head assemblies to the actuator assembly, wherein FIG. 16A is a plan view of the magnetic head arm and FIG. 16B is a side elevation view thereof. The reference numeral 6 represents the actuator assembly, 8 the carriage arm, 11 the magnetic head assembly and 13 a magnetic head.

As explained above, according to the present invention, since a magnetic head arm is produced by disposing an inlay portion produced by fitting a mounting portion of a magnetic head assembly into an insertion hole formed at the forward end of the carriage arm between every two adjacent first members having a V-shaped slit; pushing a second member into the V-shaped slit of the corresponding first member; pressing the magnetic head assembly against the carriage arm by the expanding force of the slit portions of each first member which is produced in proportion to the amount of insertion of the second member and holding the magnetic head assembly in a fixed state; and caulking the inlay portion, with the magnetic head assembly being held by the carriage arm, so as to attach the magnetic head assembly to the carriage arm, it is possible to press the magnetic head assembly against the carriage arm perpendicularly thereto when the inlay portion of the magnetic head assembly and the carriage arm is held in a fixed state. As a result, it is possible to produce high-quality magnetic head arms without scratching a signal pattern of a magnetic head assembly and with a good yield.

In addition, according to the present invention, since a mounting portion of a magnetic head assembly is composed of a protruding portion having a through hole, the protruding portion is fitted into an insertion hole of a carriage arm, and the thus-produced inlay portion is caulked by press-fitting the caulking member into the through hole of the protruding portion, the caulking operation is facilitated.

Since the caulking ball having a larger diameter than the through hole of the protruding portion is press-fitted into the through hole of the protruding portion by the caulking pin, it is possible to attach each magnetic head assembly to the actuator assembly by securely caulking the inlay portion.

According to the present invention, the protruding portion provided on a magnetic head assembly is inserted into the insertion hole formed at the forward end of each carriage arm which constitutes an actuator assembly, from a single side or both sides of the carriage arm, thereby producing an inlay portion; the position of each first member having a V-shaped slit is so controlled as to clamp each inlay portion; each second member is pushed into the V-shaped slit of the corresponding first member; each magnetic head assembly is pressed against the carriage arm by the expanding force of the slit portions of each first member which is produced in proportion to the amount of insertion of the second member, so as to hold the magnetic head assembly by the carriage arm in a fixed state; and each inlay portion is caulked in this state by inserting the caulking member into the through hole of the protruding portion via through holes formed in the first and second members, thereby attaching the magnetic head assemblies to the actuator assembly and producing a magnetic head arm. In this way, it is possible to hold the magnetic head assembly in a fixed state without scratching the magnetic head assembly and to attach the magnetic head assemblies to all the carriage arms by one caulking operation.

Furthermore, according to the present invention, an apparatus for producing a magnetic head arm is composed of a plurality of first members for clamping an inlay portion produced by fitting a protruding portion of each magnetic head assembly into an insertion hole formed at the forward end of each carriage arm; a plurality of second members each of which is pushed into the V-shaped slit of the corresponding first member so as to expand the slit portions of the first member in proportion to the amount of insertion of the second member and press the magnetic head assembly against the carriage arm so that the magnetic head assembly is held by the carriage arm in a fixed state; and a caulking machine for caulking each inlay portion by inserting a caulking member into the through hole formed in the protruding portion of each magnetic head assembly so as to attach each magnetic head assembly to an actuator assembly. It is therefore possible to attach the magnetic head assemblies to the actuator assembly by caulking each magnetic head assembly while pressing it against the carriage arm perpendicularly thereto. As a result, according to the apparatus for producing a magnetic head arm of the present invention, it is possible to produce high-quality magnetic head arms without scratching a signal pattern of a magnetic head assembly and with a good yield.

According to the present invention, since a jig for placing a caulking set holder thereon is provided and a lower wedge elevating mechanism for moving a lower wedge upward is provided in the jig, it is possible to elevate lower wedges by a simple operation so as to clamp an inlay portion.

Since an upper wedge pushing mechanism for pushing the upper wedges which are set in the caulking set holder is provided in the caulking machine, it is possible to securely fix and caulk each inlay portion.

In addition, since a receiving pin for receiving a caulking ball which is pushed by a caulking pin, from the opposite direction to the direction of press-fitting is moved until the receiving pin comes into contact with the caulking ball, and a receiving force weaker than the press-fitting force is supplied to the receiving pin from the opposite direction to the direction of press-fitting, it is possible to securely caulk each inlay portion by the caulking ball.

As many apparently widely different embodiments of the present invention can be made without departing from the spirit and scope thereof, it is to be understood that the invention is not limited to the specific embodiment thereof except as defined in the appended claims.

What is claimed is:

1. A method of producing a magnetic head arm by attaching magnetic head assemblies to an actuator assembly provided with carriage arms and a driving portion for driving said carriage arms, comprising the steps of:

disposing an inlay portion produced by fitting a mounting portion of a magnetic head assembly into an insertion hole formed at a forward end of a carriage arm, between adjacent first members having a V-shaped slit;

pushing a second member into said V-shaped slit of each first member;

pressing said magnetic head assembly against said carriage arm by the expanding force of the slit portions of each first member which is produced in proportion to an mount of insertion of said second member=and holding said magnetic head assembly in a fixed state; and caulking said inlay portion by inserting caulk through a through hole in said mounting portion, with said magnetic head assembly being held by said carriage arm, so as to attach said magnetic head assembly to said carriage arm.

2. A method of producing a magnetic head arm according to claim 1, further comprising the step of:

forming said mounting portion of said magnetic head assembly by a protruding portion having said through hole so that said protruding portion is fitted into said insertion hole of said carriage arm;

wherein said inlay portion is caulked by press-fitting a caulking member into said through hole of said protruding portion.

3. A method of producing a magnetic head arm according to claim 2, wherein said caulking member includes a caulking ball having a larger diameter than the diameter of said through hole of said protruding portion, and a caulking pin for press-fitting said caulking ball into said through hole of said protruding portion.

4. A method of producing a magnetic head arm by attaching magnetic head assemblies to an actuator assembly provided with a plurality of carriage arms and a driving portion for driving said carriage arms, comprising the steps of:

fitting a protruding portion provided at each magnetic head assembly into an insertion hole provided at a forward end of each carriage arm, from a single side or both sides of said insertion hole so that an inlay portion is produced;

controlling the position of each first member having a V-shaped slit so as to clamp the corresponding inlay portion;

pushing a second member into said V-shaped slit of each first member;

pressing said magnetic head assembly against said carriage arm by the expanding force of the slit portions of each first member which is produced in proportion to an amount of insertion of said second member, and holding said magnetic head assembly in a fixed state;

caulking each inlay portion, with each magnetic head assembly being held by each carriage arm, by inserting a caulking member into a through hole formed in said protruding portion via through holes formed in each first member and each second member;

attaching each magnetic head assembly to each carriage arm by the caulking operation.

5. A method of producing a magnetic head arm according to claim 4, wherein said caulking member includes a caulking ball having a larger diameter than the diameter of said through hole of said protruding portion, a caulking pin for press-fitting said caulking ball into said through hole of said protruding portion, and a receiving pin for receiving said caulking ball which is press-fitted by said caulking pin, in the opposite direction to the direction of press-fitting; and all inlay portions are caulked by serially press-fitting said caulking ball into each inlay portion with said caulking pin.

6. A magnetic head arm comprising:

magnetic head assemblies; and an actuator assembly which includes carriage arms and a driving portion for driving said carriage arms and to which said magnetic head assemblies are attached, wherein said magnetic head arm is produced by a method comprising the steps of:

disposing an inlay portion produced by fitting a mounting portion of a magnetic head assembly into an insertion hole formed at a forward end of said carriage arm between [every two]adjacent first members having a V-shaped slit;

pushing a second member into said V-shaped slit of each first member;

pressing said magnetic head assembly against said carriage arm by the expanding force of the slit portions of each first member which is produced in proportion to an amount of insertion of said second member and holding said magnetic head assembly in a fixed state; and caulking said inlay portion by inserting caulk through a through hole in said mounting portion, with said magnetic head assembly being held by said carriage arm, so as to attach said magnetic head assembly to said carriage arm.

7. An apparatus for producing a magnetic head arm by attaching magnetic head assemblies to an actuator assembly provided with carriage arms and an actuator for rotating said carriage arms, said apparatus comprising:

a plurality of first members each having a V-shaped slit for clamping an inlay portion produced by fitting a protruding portion that forms said mounting portion of the magnetic head assembly into an insertion hole formed at the forward end of a carriage arm;

a plurality of second members each of which is pushed into said V-shaped slit of the corresponding first member, and expands the slit portions of said first member in proportion to an amount of insertion of each second member so as to press said magnetic head assembly against said carriage arm and hold said magnetic head assembly in a fixed state; and a caulking machine for caulking said inlay portion by inserting a caulking member into a through hole formed in said protruding portion of said magnetic head assembly, which has been fitted into said insertion hole, so as to attach said magnetic head assembly to said actuator assembly.

8. An apparatus for producing a magnetic head arm according to claim 7, further comprising:

a caulking set holder which accommodates lower wedges as said first members and includes an actuator receiving portion for receiving said actuator assembly; wherein the lower wedges are disposed lower than the forward end portion of each carriage arm of said actuator assembly and which are vertically movably supported on said caulking set holder and each of said lower wedges moves upward in the state in which said protruding portion of said magnetic head assembly is fitted in said insertion hole at the forward end of each carriage arm so as to clamp the corresponding inlay portion, then upper wedges as said second members are positioned above the caulking set holder and move downward so as to hold the corresponding inlay portion in a fixed state.

9. An apparatus for producing a magnetic head arm according to claim 8, further comprising:

a jig on which said caulking set holder is placed and which includes a lower wedge elevating mechanisms for moving said lower wedges upward.

10. An apparatus for producing a magnetic head arm according to claim 8, wherein said caulking machine includes an upper wedge pushing mechanism for pushing said upper wedges in the state in which said caulking set holder is mounted on said caulking machine.

11. An apparatus for producing a magnetic head arm according to claim 10, wherein said caulking machine further includes:

a caulking pin for press-fitting a caulking ball which has a larger diameter than the diameter of said through hole of said protruding portion into said through hole of said protruding portion;

a caulking pin driving portion for supplying a press-fitting force to said caulking pin and moving said caulking pin in the direction of press-fitting;

a receiving pin for receiving said caulking ball which is press-fitted with said caulking pin, from the opposite direction to said direction of press-fitting; and a means for moving said receiving pin to the position at which said receiving pin comes into contact with said caulking ball, and supplying a receiving force weaker than said press-fitting force to said receiving pin in the opposite direction to said direction of press-fitting.

12. An apparatus for producing a magnetic head arm according to claim 11, wherein said means for supplying said receiving force to said receiving pin is an air cylinder.

* * * * *

UNITED STATES PATENT AND TRADEMARK OFFICE
CERTIFICATE OF CORRECTION

PATENT NO. : 5,657,531
DATED : August 19, 1997
INVENTOR(S) : Sato et al.

It is certified that error appears in the above-identified patent and that said Letters Patent is hereby corrected as shown below:

Column 5, line 58, delete "14" before "magnetic".

Column 8, line 14, delete "Jig" and insert --jig-- therefor.

Column 11, line 31, insert --,-- after first occurrence of "portion".

Column 11, line 40, delete "member = and" and insert --member, and-- therefor.

Signed and Sealed this

First Day of September, 1998

Attest:

BRUCE LEHMAN

Attesting Officer

Commissioner of Patents and Trademarks